United States Patent [19]

Horlbeck et al.

[11] 4,200,732

[45] Apr. 29, 1980

[54] PROCESS FOR PREPARING VERY VISCOUS HEAT STABLE POLY(BUTYLENE TEREPHTHALATE)

[75] Inventors: Gernot Horlbeck, Haltern; Klaus Burzin, Marl, both of Fed. Rep. of Germany

[73] Assignee: Chemische Werke Huls A.G., Marl, Fed. Rep. of Germany

[21] Appl. No.: 12,184

[22] Filed: Feb. 14, 1979

[30] Foreign Application Priority Data

Mar. 3, 1978 [DE] Fed. Rep. of Germany ....... 2809101

[51] Int. Cl.$^2$ .................................................. C08G 63/18
[52] U.S. Cl. ................................ 528/274; 528/298; 528/309; 525/437
[58] Field of Search ................ 528/273, 274, 298, 309

[56] References Cited

U.S. PATENT DOCUMENTS

| | | | |
|---|---|---|---|
| 3,953,404 | 4/1976 | Borman | 528/273 |
| 3,962,190 | 6/1976 | Wear | 528/273 |
| 3,966,680 | 6/1976 | Wear | 528/273 X |
| 4,022,752 | 5/1977 | Horn | 528/273 X |
| 4,101,601 | 7/1978 | Thomas | 528/273 X |
| 4,132,707 | 1/1979 | Borman | 528/273 |

*Primary Examiner*—Lucille M. Phynes
*Attorney, Agent, or Firm*—Millen & White

[57] ABSTRACT

In a process for preparing very viscous, heat-stable poly(butylene terephthalate) by condensing terephthalic acid, or a lower alkyl ester thereof, with 1,4-butanediol in two stages at an elevated temperature and in the presence of conventional catalysts, an improvement comprises carrying out the condensation in the presence of 0.5 to 15 mole %, relative to the number of moles of terephthalic acid units, of 9,10-dihydro-9,10-[cis-11,12-bis(hydroxymethyl)-ethano]-anthracene.

8 Claims, No Drawings

PROCESS FOR PREPARING VERY VISCOUS HEAT STABLE POLY(BUTYLENE TEREPHTHALATE)

BACKGROUND OF THE INVENTION

The present invention relates to a process for preparing very viscous, heat-stable poly(butylene terephthalate) by condensation of terephthalic acid, or a lower alkyl ester thereof, with 1,4-butanediol in two stages at an elevated temperature and in the presence of a conventional catalyst.

Poly(butylene terephthalate) (PBTP) is an excellent material for the production of films, sheets, moldings and the like. For producing moldings by injection-molding and extrusion, in particular, PBTP should have a reduced specific viscosity of >1.0 dl/g (measured at 25° C. in a solution of 0.23 g of PBTP in 100 ml of a solvent mixture of phenol and tetrachloroethane in the weight ratio of 60:40).

Usually, PBTP is prepared by first trans-esterifying dimethyl terephthalate with an excess of 1,4-butanediol, in the presence of a conventional catalyst, under normal pressure, to produce an oligo-ester; and then removing the excess 1,4-butanediol under reduced pressure and at an elevated temperature, in the course of which a polycondensation of the oligo-ester formed during the trans-esterification takes place (J. G. Smith et al., J. Polymer Sci. (A) 4, 1,851 (1966); Kunststoff-Handbuch (Plastics Handbook), volume VIII, C. Hanser Verlag Munich, edited by L. Goerden).

Using these conventional processes, the high viscosities that are required, for example, for extrusion processes cannot be achieved. The viscosity is limited since degradation reactions already start due to the relatively long heat exposure during the polycondensation. Thus, a certain viscosity cannot be exceeded. Thus, in order to achieve the high viscosities needed, for example, for extrusion applications, a solid phase post-condensation of the PBTP is therefore usually additionally carried out (British Pat. No. 1,066,162; U.S. Pat. No. 3,405,098).

However, the solid phase post-condensation is a technically demanding process, frequently exhibiting undesirable concomitant phenomena, such as, for example, a deterioration of the intrinsic color of the polyester.

Another possible way of increasing the viscosity of these polyesters is by co-condensing trifunctional or polyfunctional alcohols, carboxylic acids or their esters (German Auslegeschrift No. 1,614,980). However, it is difficult to control this reaction so as to avoid crosslinking. Furthermore, this process easily leads to products containing specks.

SUMMARY OF THE INVENTION

Accordingly, it is an object of this invention to develop a process for preparing highly viscous PBTP which does not have the disadvantages described above, and which permits the preparation of PBTP not having the inferior properties mentioned above.

Upon further study of the specification and appended claims, further objects and advantages of this invention will become apparent to those skilled in the art.

These objects have been achieved by providing in a process for preparing very viscous, heat-stable poly(butylene terephthalate) by condensing terephthalic acid, or a lower alkyl ester thereof, with 1,4-butanediol in two stages at an elevated temperature and in the presence of conventional catalysts, the improvement which comprises carrying out the condensation in the presence of 0.5 to 15 mole %, relative to the number of moles of terephthalic acid units, of 9,10-dihydro-9,10-[cis-11,12-bis(hydroxymethyl)-ethano]-anthracene.

This invention also provides the highly viscous PBTP which is thus prepared.

DETAILED DISCUSSION

Suitable lower alkyl esters of terephthalic acid include the mono- and di-esters of alkyl groups having 1-4 carbon atoms.

Up to 30% of the terephthalic acid employed as a starting material can be replaced by other dicarboxylic acids which are in themselves known. Examples of suitable dicarboxylic acids include isophthalic acid, phthalic acid, diphenyldicarboxylic acid, 4,4-sulphonyldibenzoic acid, 1,4-cyclohexanedicarboxylic acid, adipic acid, sebacic acid and decane-1,10-dicarboxylic acid, etc. Thus, such dicarboxylic acids are substantial equivalents of the terephthalic acid for use in the process of this invention.

Up to 30% of the 1,4-butanediol employed as a starting material can be replaced by other diols, such as, for example, ethylene glycol, 1,4- or 1,3-dimethylolcyclohexane, 1,3-propanediol, neopentylglycol or 1,6-hexanediol, etc. Such other diols are substantial equivalents of 1,4-butanediol for use in the process of this invention.

The very viscous, heat-stable PBTP according to this invention, except as otherwise indicated herein, is prepared in accordance with processes which are in themselves conventional for high-molecular weight polyesters, such processes being described, for example, by Sorensen and Campbell in Preparative Methods of Polymer Chemistry, Interscience Publishers Inc., NY 1961, pages 111–127 or in the Kunststoff-Handbuch (Plastics Handbook) volume VIII, C. Hanser Verlag Munich, edited by L. Goerden, whose disclosures are incorporated by reference herein.

Initially, in these processes, an oligo-ester is prepared in a first stage of trans-esterification of, for example, dimethyl terephthalate with 1,4-butanediol at 180°–200° C. and a pressure of approximately 1,000 mbar (normale pressure) in the presence of a conventional trans-esterification catalyst. Usually, the molar ratio of dimethyl terephthalate to 1,4-butanediol which is employed is 1:1.25–3, preferably 1:1.5–2. Suitable trans-esterification catalysts include, inter alia, titanium alcoholates (e.g., methylate, propylate, isopropylate or butylate) or soluble zinc, calcium or manganese salts, (with anions of carboxylic acids, e.g. acetic acid or benzoic acid) in an amount of 0.005 to 0.08, preferably of 0.01 to 0.04, mole %, relative to the number of moles of dimethyl terephthalate units. The time of reaction usually is 2–3 hours.

Thereafter, a second stage polycondensation of the oligo-ester is carried out at temperatures in the range of 240°–260° C. at a pressure of 0.3–0.5 mbar in the presence of a polycondensation catalyst. Suitable polycondensation catalysts include, inter alia, the titanium alcoholates as mentioned above, in an amount of 0.005 to 0.08, preferably of 0.01 to 0.04 mole %, relative to the number of moles of dimethyl terephthalate. The time of reaction usually is 1–1.5 hours.

The compound which is added in accordance with this invention, namely, 9,10-dihydro-9,10-[cis-11,12-bis-(hydroxymethyl)-ethano]-anthracene, is preferably added to the reaction mixture before the trans-esterification reaction; however, it can also be added at any other point in time during the trans-esterification, up to the start of the polycondensation reaction. A process of preparing this compound is described, for example, in J. Org. Chem. 38, 1,944 (1973). Generally, 0.5 to 15 mole %, preferably 3-10 mole %, of this compound, based on the number of moles of terephthalic acid units (or other dicarboxylic acids), is used.

Other possible additives which may be introduced are conventional heat stabilizers and oxidation stabilizers, such as sterically hindered phenols, secondary amines or the like; as well as pigmenting agents, such as, for example, titanium dioxide.

The process of this invention includes polyesters having very good general properties, such as intrinsic color, heat stability (i.e., stable to temperatures of 270°-280° C.) hydrolytic stability, stability to UV and the like. The reduced specific viscosity of the products obtained lies in the range of 1.0-1.4 dl/g, especially 1.15-1.30 dl/g. Since these viscosity properties permit the polyesters to be employed directly in, for example, extrusion processes, the heretofore required, very time-consuming and energy-consuming, solid phase post-condensation can be omitted. Viewed overall, a great savings in time and energy results from the preparation of PBTP in accordance with this invention.

The 9,10-dihydro-9,10-[cis-11,12-bis(hydroxymethyl)-ethano]-anthracene additive remains in the PBTP which is produced by the process of this invention. Thus, the resultant novel composition also forms part of this invention and generally contains 0.6-17 weight percent of the additive based on the weight of PBTP.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example(s), all temperatures are set forth uncorrected in degrees Celsius; unless otherwise indicated, all parts and percentages are by weight.

EXAMPLES 1-8 and COMPARATIVE EXAMPLES A-C

To carry out the experiments, 58.3 g of dimethyl terephthalate, 54 g of 1,4-butanediol and an amount indicated in the table below of titanium tetraisopropylate (a 10% strength solution in isopropanol) are melted in a customary polycondensation unit and trans-esterified for three hours at 180°-200° C. in a stream of nitrogen, with liberated methanol distilling from the reaction mixture. The particular amount of 9,10-dyhydro-9,10-[cis-11,12-bis-(hydroxymethyl)-ethano]-anthracene shown in the table is then dissolved in the reaction mixture. Thereafter, the reaction mixture is heated to 250° C. in the course of half an hour in a slight stream of N₂, with the excess 1,4-butanediol distilling off, after which the pressure is reduced to less than 0.4 mbar. The batch is then polycondensed under these conditions in 75 minutes. The reduced specific viscosity of the polyesters was determined at 25° C. in a solution of 0.23 g of polyester in 100 ml of a mixture of phenol and tetrachloroethane in the weight ratio of 60:40.

TABLE 1

| Example | Mole %, Relative To DMT, of DEA* | Catalyst Concentration** | RSV*** [dl/g] | Preparation Time [min] |
|---|---|---|---|---|
| 1 | 1 | A | 1.02 | 285 |
| 2 | 3 | A | 1.15 | 285 |
| 3 | 5 | A | 1.24 | 285 |
| A | — | A | 0.85 | 285 |
| 4 | 1 | B | 1.07 | 285 |
| 5 | 3 | B | 1.21 | 285 |
| 6 | 5 | B | 1.25 | 285 |
| B | — | B | 0.91 | 285 |
| 7 | 3 | C | 1.13 | 285 |
| 8 | 5 | C | 1.19 | 285 |
| C | — | C | 0.79 | 285 |

*DEA: 9,10-dihydro-9,10-[cis-11,12-bis(hydroxymethyl)-ethano]-anthracene
**A: 0.016 mole %, relative to DMT, of titanium tetraisopropylate
B: 0.03 mole %, relative to DMT, of titanium tetraisopropylate
C: 0.01 mole %, relative to DMT, of titanium tetraisopropylate
***RSV: Reduced specific viscosity COMPARATIVE EXAMPLES D and E The polyester from Example A of Table 1 was subjected to a solid phase post-condensation in accordance with the prior art, in order to reach the viscosity achieved in Example 2 of Table 1. The post-condensation was carried out in a tumble-drier under the conditions shown in Table 2.

TABLE 2

| Example | Conditions of the solid phase post-condensation | Temperature [°C.] during the solid phase post-condensation | Time [min] required for the solid phase post-condensation | RSV [dl/g] after completion of the solid phase post-condensation |
|---|---|---|---|---|
| D | Vacuum (~0.1 mbar) | 210 | 480 | 1.25 |
| E | Stream of N₂ (normal pressure) | 210 | 900 | 1.25 |

The comparisons clearly show that using the process of this invention, the solid phase post-condensation necessary according to the prior art can be omitted. According to this invention, an after-treatment is unnecessary, since the required high viscosities are already reached at the end of the polycondensation reaction (See Table 1).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for preparing very viscous, heat-stable poly(butylene terephthalate) by condensing terephthalic acid or a lower alkyl ester thereof, with 1,4-butanediol in two stages at an elevated temperature and in the presence of conventional catalysts, the improvement which comprises carrying out the condensation in the presence of 0.5 to 15 mole %, relative to the number of moles of terephthalic acid units, of 9,10-dihydro-9,10-[cis-11,12-bis-(hydroxymethyl)-ethano]-anthracene.

2. The process of claim 1, wherein 3 to 10 mole %, relative to the number of moles of terephthalic acid units, of 9,10-dihydro-9,10-[cis-11,12-bis-(hydroxymethyl)-ethano]-anthracene are used.

3. The process of claim 1, wherein in the first stage an oligo ester is produced and in the second stage a polycondensation of the oligo ester is carried out.

4. The process of claim 1, wherein the 9,10-dihydro-9,10-[cis-11,12-bis-(hydroxymethyl)-ethanol]-anthracene is added prior to the beginning of the polycondensation stage.

5. The process of claim 4, wherein the 9,10-dihydro-8,10-[cis-11,12-bis-(hydroxymethyl)-ethano]-anthracene is added prior to the beginning of the oligo ester production first stage.

6. The poly(butylene terephthalate) produced by the process of claim 1.

7. A process of preparing a molding which comprises molding the poly(butylene terephthalate) produced by the process of claim 1.

8. Poly(butylene terephthalate) containing 0.6–17 weight percent of 9,10-dihydro-9,10-[cis-11,12-bis-(hydroxymethyl)-ethano]-anthracene based on the weight of poly(butylene terephthalate).

UNITED STATES PATENT AND TRADEMARK OFFICE
CERTIFICATE OF CORRECTION

PATENT NO. : 4,200,732

DATED : April 29, 1980

INVENTOR(S) : Gernot Horlbeck et al

It is certified that error appears in the above-identified patent and that said Letters Patent are hereby corrected as shown below:

Column 5, line 7: reads "9,10-[cis-11,12-bis-(hydroxymethyl)-ethanol]-anthra- "

should read -- 9,10-[cis-11,12-bis-(hydroxymethyl)-ethano]-anthra- --

Signed and Sealed this

Fifth Day of August 1980

[SEAL]

Attest:

SIDNEY A. DIAMOND

Attesting Officer

Commissioner of Patents and Trademarks